United States Patent [19]

Kinoshita et al.

[11] 4,322,267
[45] Mar. 30, 1982

[54] CONTROL APPARATUS FOR RESIDUAL HEAT REMOVAL SYSTEM FOR NUCLEAR REACTOR

[75] Inventors: Mitsuo Kinoshita, Hitachi; Takashi Omori, Kitaibaraki, both of Japan

[73] Assignee: Hitachi, Ltd., Tokyo, Japan

[21] Appl. No.: 77,835

[22] Filed: Sep. 21, 1979

[30] Foreign Application Priority Data

Sep. 22, 1978 [JP] Japan ................................. 53/117144

[51] Int. Cl.³ .............................................. G21C 7/00
[52] U.S. Cl. ..................................... 376/216; 376/299
[58] Field of Search ..................... 176/20, 24, 38, 50, 176/54-56

[56] References Cited

U.S. PATENT DOCUMENTS

| | | | |
|---|---|---|---|
| 3,127,322 | 5/1964 | Dodd | 176/38 |
| 3,384,550 | 5/1968 | Hanzalek | 176/38 |
| 3,431,168 | 3/1969 | Kjemtrup | 176/38 |
| 3,437,557 | 4/1969 | Kaipainen | 176/38 |
| 3,718,539 | 2/1973 | West et al. | 176/38 |
| 3,931,500 | 1/1976 | Berkebile et al. | 176/24 |
| 4,046,628 | 9/1977 | Middleton | 176/38 |
| 4,051,892 | 10/1977 | Reinsch | 176/38 |
| 4,157,939 | 6/1979 | Schabert et al. | 176/38 |
| 4,187,147 | 2/1980 | Braun et al. | 176/38 |

FOREIGN PATENT DOCUMENTS

| | | | |
|---|---|---|---|
| 51-2898 | 1/1976 | Japan | 176/20 |
| 51-12794 | 4/1976 | Japan | 176/20 |
| 52-57494 | 5/1977 | Japan | 176/20 |

*Primary Examiner*—Sal Cangialosi
*Attorney, Agent, or Firm*—Craig and Antonelli

[57] ABSTRACT

In a control apparatus for residual heat removal system for a nuclear reactor in which the steam generated in the reactor vessel is cooled and condensed into water through a heat exchanger and the condensed water is fed back by a feedwater pump driven by the reactor steam so as to cool the reactor core, the pressure of the condensed water at the exit of the heat exchanger is increased with the rise of the reactor water level so as to decrease the flow of the condensed water, that is, coolant water and the flow-in of the make-up water from the make-up water reservoir communicating with the outlet port of the condenser while the quantity of the reactor steam supplied to the turbine is decreased with the increase in the reactor temperature fall rate so as to decrease the flow of the coolant water fed back into the reactor vessel.

7 Claims, 6 Drawing Figures

CONTROL APPARATUS FOR RESIDUAL HEAT REMOVAL SYSTEM FOR NUCLEAR REACTOR

BACKGROUND OF THE INVENTION

This invention relates to an apparatus for controlling a residual heat removal system used for a nuclear reactor, which can safely cool the reactor within a short time after it is shut down.

To begin with, the outline of a typical nuclear power plant will be explained. A reactor is placed in a container vessel and the heat generated through nuclear reactions in the reactor core turns the coolant water into steam.

The steam is taken out through a main stream conduit externally of the container to drive a main turbine. The main turbine in turn drives a generator coupled directly to the main turbine so that electric power is generated. The steam, after having driven the main turbine, is condensed through a condenser into water. The condensed water is fed back as coolant water through a condensate pump and a feedwater pump into a reactor vessel. Thus, a nuclear power plant includes a closed loop of coolant water.

When a fault occurs inside or outside the reactor, several control rods are immediately inserted into the reactor, that is, the reactor is scrammed (the nuclear chain reaction in the fuel is stopped). Simultaneously with scramming, isolation valves provided in the main steam conduit immediately inside and outside the container vessel are closed, depending on the nature of fault, to prevent radioactive materials from escaping from the reactor vessel. With the isolation valves closed, the reactor core can no longer be cooled by the main cooling system including the main turbine. Since a reactor continues to generate decay heat for more than ten hours after scram, an auxiliary cooling system must be provided for the reactor which takes out the residual heat from the reactor to cool the reactor down when the isolation valves have been closed. Such an auxiliary cooling system is a residual heat removal system (hereinafter referred to simply as RHR system) with which the invention is concerned.

The RHR system comprises a closed loop which is started upon the closure of the isolation valves, the reactor steam is first led to a heat exchanger to be condensed into water and the condensed water is fed as coolant into the reactor vessel by a pump. This pump is so designed as to be driven by a turbine actuated by the reactor steam since in an emergency there is a large possibility that the power source in the plant is out of use and therefore the RHR system must operate without resorting to the plant power source. The steam, having done work on the turbine, is exhausted into another vessel. A make-up water reservoir communicates with the part of the pipes between the heat exchanger and the feedwater pump so as to prevent cavitation in the pump when the flow of water out of the heat exchanger decreases. Most of the above mentioned components of the RHR system are housed in the container vessel and the control of the system is performed by three separately provided control devices as follows.

(a) Device for controlling the flow of the condensed water:

This control device operates the heat exchanger inlet valve to control the internal pressure $P_H$ of the heat exchanger to a preset value $(P_H)_{ref}$ in order that the flow $W_H$ of the condensed water through the exchanger per unit time may be stabilized.

(b) Device for controlling the flow of feed water:

This device controls the aperture of the steam inlet valve of the turbine to control the flow $W_F$ of feed water to a preset value $(W_F)_{ref}$ in order that the coolant water may be fed into the reactor vessel at a constant rate.

(c) Device for controlling the flow of make-up water:

This serves to supply make-up water to the pump when the reactor-side pressure $P_S$ at the junction of the feedwater pipe and the make-up water pipe falls below a preset value $(P_S)_{ref}$. Normally, $(P_S)_{ref} > P_S$ and the flow of make-up water $W_C = 0$ so that $W_H = W_F$.

According to this RHR system, since the flow $W_{TB}$ of water resulting from steam which has driven the turbine is exhausted, the level $L_R$ of the reactor water falls as measured by the expression (1) given below.

$$L_R \approx L_{RO} - \int_0^t \frac{W_{TB} V_f}{A_R} dt \qquad (1)$$

Here, $L_{RO}$ indicates the initial reactor water level, $A_R$ the cross sectional area of the reactor vessel, t the time for which the reactor is being operated and $V_f$ the specific volume of the reactor water, the reactor water meaning saturated water.

According to a test calculation for a boiling water reactor having a rated output of 1,100,000 KW, the reactor water level $L_R$ falls about two meters down in several hours after scram and thereafter the emergency core cooling system ECCS as a safety mechanism other than the RHR system starts operating so that a large amount of cooling water is injected into the reactor vessel to resume the initial level. This is a preferable in view of the safety of the reactor since the safety is double assured by the RHR system and the ECCS. However, the flood of the cooling water causes thermal impacts on the reactor core assembly and the reactor vessel, resulting in causing deterioration thereof. It is therefore preferable if the residual heat can be removed by the RHR system alone. The problems caused by the supercooling due to the operation of the ECCS arises mainly from the fall of the reactor water level due to the operation of the RHR system.

On the other hand, the RHR system must not only remove the residual heat but also observe the preset rate of the fall of, for example, the reactor water temperature to protect the members in the reactor vessel from thermal impacts. The following expression (2) denotes the rate of the fall of the reactor water temperature, i.e. $-\Delta\text{Temp}/\Delta t$, as one of the main temperature fall rate, calculated from the energy balance for a reactor with its ECCS out of operation.

$$-\frac{\Delta \text{Temp}}{\Delta t} \doteq \frac{1}{M_f} \{W_H(i_g - i_F) + W_{TB}(i_g - i_f) - Q_R\} \qquad (2)$$
$$= \frac{1}{M_f} \{W_F(i_g - i_F) + W_{TB}(i_g - i_f) - Q_R\}$$

In the expression (2), $Q_R$ indicates the decay heat in the reactor, $T_{emp}$ the temperature of the reactor water, $M_f$ the weight of the entire reactor water, $i_g$ the enthalpy of steam, $i_f$ the enthalpy of the reactor water (saturated water), and $i_F$ the enthalpy of the cooling water. In this case, it is clear that $W_H(i_g - i_F) = W_F(i_g - i_F)$, both quantities indicating an amount of heat required to turn feed water at the flow rate of $W_H = W_F$ into steam, and that the quantity $W_{TB}(i_g - i_f)$ denotes an amount of heat required to turn the condensed water at the flow rate of $W_{TB}$ into steam.

For example, the rate of the fall of the reactor water temperature must be maintained at a present value, e.g. 55° C./hour, to keep the residual thermal stress in, for example, the container vessel smaller than an allowable limit. However, since the decay heat $Q_R$ decreases with time, the temperature fall rate increases when $W_F$ is kept constant, as seen from the expression (2), until it exceeds 55° C./hour. Accordingly, the operator must change the preset value $(W_F)_{ref}$ for the coolant water flow from time to time by manual setting in order that the temperature fall rate may not exceed the maximum allowable value 55° C./hour. If $(W_F)_{ref}$ is so set as to correspond to 30° C./hour whereby the rate may not exceed 55° C./hour, the problem of supercooling can be solved, but too much time is required to remove the residual heat.

SUMMARY OF THE INVENTION

One object of this invention is to provide an apparatus for controlling an RHR system for a reactor, which can suppress the fluctuation of the reactor water level.

Another object of this invention is to provide an apparatus for controlling an RHR system for a reactor, capable of observing the preset rate of the fall of the reactor temperature.

Still another object of this invention is to provide an apparatus for controlling an RHR system for a reactor, capable of satisfying the requirements for the reactor water level and the reactor temperature fall rate.

According to this invention, which has been made to attain the above objects, there is provided a system in which the steam generated in the reactor vessel is led to the heat exchanger to be condensed into cooling water and the cooling water is returned to the reactor core via the control valve and the pump driven by the turbine actuated by reactor steam so as to cool the reactor core, wherein a make-up water supply tank is provided which communicates via a non-return or check valve with the outlet of the control valve and when the reactor water level lowers, the control valve is closed to decrease the pressure $P_s$ at the outlet of the control valve, and the lowering of the reactor water level is compensated by supplying make-up water from the tank when the pressure $P_s$ becomes lower than the pressure $P_c$ at which the check valve is opened.

DESCRIPTION OF THE PREFERRED EMBODIMENT

Figure 1:
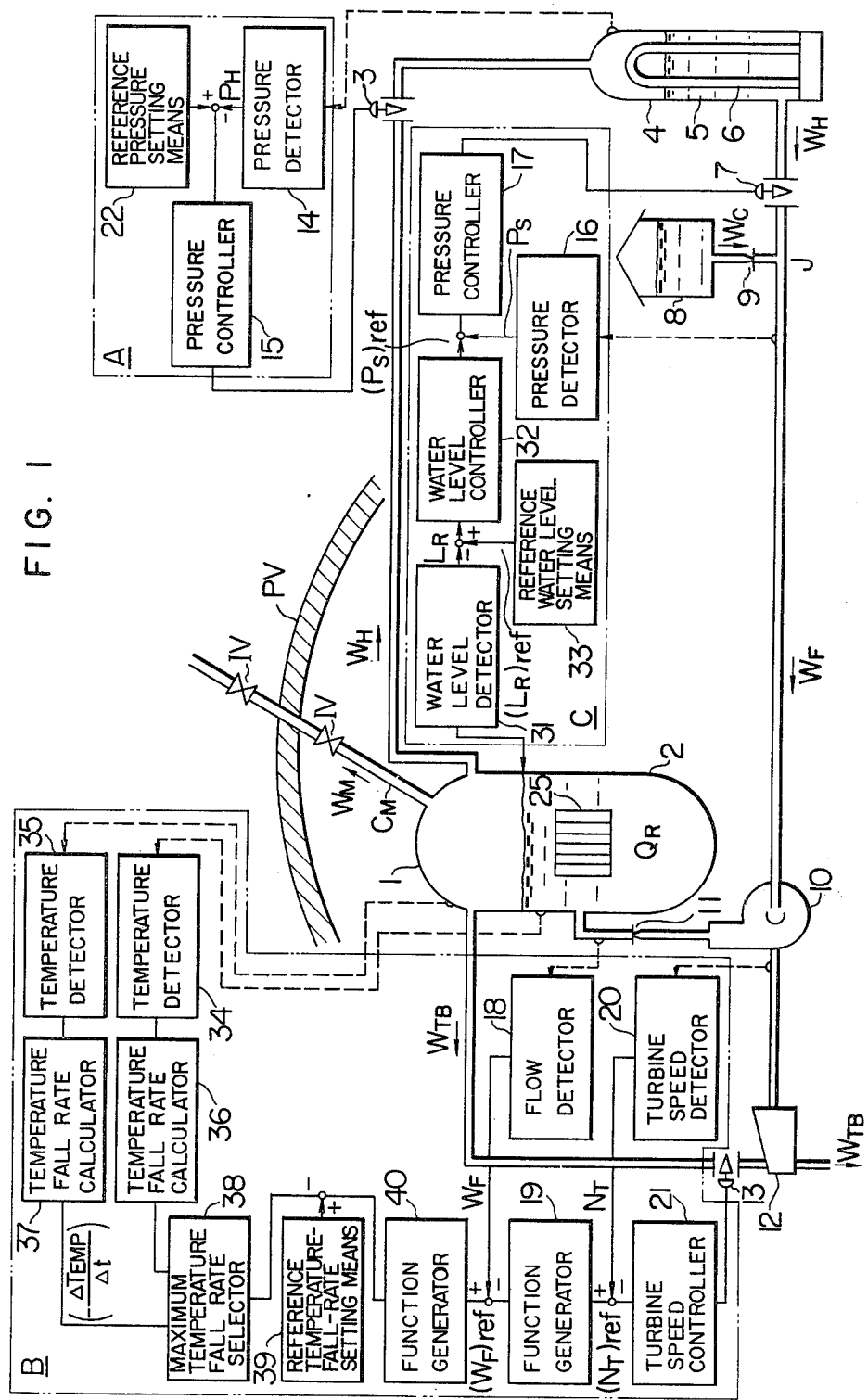
FIG. 1 schematically shows an RHR system for a reactor according to this invention and a make-up water control apparatus and a feedwater flow control apparatus according to this invention.

FIG. 1 shows an embodiment of this invention. Steam $W_M$ generated in the reactor 1 is normally fed to a main turbine, not shown, via a main steam conduit $C_M$ and isolation valves IV immediately inside and outside a container vessel PV. When a fault occurs inside or outside the reactor 1 and when the reactor 1 is scrammed by a mechanism, not shown, with the result that the isolation valves IV are closed, the decay heat $Q_R$ generated in the reactor core 25 is taken out or dissipated by an RHR (residual heat removal) system shown in FIG. 1. Schematically, the RHR system has such a constitution as follows: the steam generated in the reactor 1 is led to a heat exchanger 4 and condensed there into water 5 and the condensed water 5 is fed back into the reactor 1 by a pump 10 driven by a turbine 12 actuated by the reactor steam so as to cool the reactor core 25. A control valve 3 is controlled by a condensate flow control apparatus A, which is well known and easily obtainable. The function of this condensate flow control apparatus A is as follows: the reactor steam generated by the decay heat $Q_R$ is led through the control valve 3 to the heat exchanger 4 and condensed into water 5 at a rate of a flow $W_H$ by a cooling pipe assembly 6 in the heat exchanger 4, and the pressure $P_H$ in the heat exchanger 4 is controlled to the value $(P_H)_{ref}$ set by a reference pressure setting means 22 by means of a pressure detector 14, a pressure controller 15 and the regulation valve 3 so that the condensate flow $W_H$ from the heat exchanger 4 may be stabilized.

Make-up water flow $W_c$ from a make-up water tank 8 is added to the condensate flow $W_H$ at the point J and the resultant flow, i.e. feedwater flow, $W_F$ is fed to the pump 10. A check valve 9 serves to prevent the return of the supplied make-up water to the make-up water tank 8. The aperture of a control valve 7 is controlled by a make-up water control apparatus C.

The feed water $W_F$ is pressurized by the pump 10 and supplied into the reactor 1 through a check valve 11. The pump 10 is driven by the turbine 12 and the flow $W_{TB}$ of steam to drive the turbine 12 is controlled by a regulation valve 13 near the inlet of the turbine 12, which valve is in turn controlled by a feedwater flow control apparatus B. According to this invention, the problems concerning the lowering of the reactor water level and the temperature fall rates can be solved by the combination of the control apparatuses B and C described above. Namely, the RHR system as an embodiment of this invention operates as follows. In the case of scram, the reactor water level lowers since the steam $W_{TB}$ to drive the turbine 12 is exhausted out of the system. To compensate the exhausted steam, i.e. reactor water, the make-up water control apparatus C is used to change the pressure at the outlet of the make-up water tank 8 according to the change in the reactor water level so that a required amount of make-up water $W_c$ is supplied into the reactor 1 and also the condensate flow $W_H$ is decreased. On the other hand, the temperature fall rates in the reactor 1 vary owing to the supply of the make-up water and the change in the decay heat with time. Accordingly, the residual heat is removed safely during a shortest period of time by controlling the feedwater flow $W_F$ by the feedwater control apparatus B in such a manner that the maximum one of the temperature fall rates at several points in the reactor 1 always equals the preset desired value.

First, the control of the reactor water level by the make-up water control apparatus will be explained. The level $L_R$ of the reactor water is detected by a water level detector 31. A water level controller 32 determines the desired value $(P_s)_{ref}$ for the pressure at the outlet of the make-up water tank 8 in accordance with the difference between the detected level $L_R$ and the preset value $(L_R)_{ref}$ set by a reference water level setting means 33. Then, the pressure $P_s$ at the outlet of the make-up water tank 8 is controlled to the desired value $(P_s)_{ref}$ by the combined operations of a pressure detector 16, a pressure controller 17 and the control valve 7. The relationships between the signals at points in the control apparatus C, the various flows and the level of the reactor water are as shown in FIG. 2.

Figure 2:
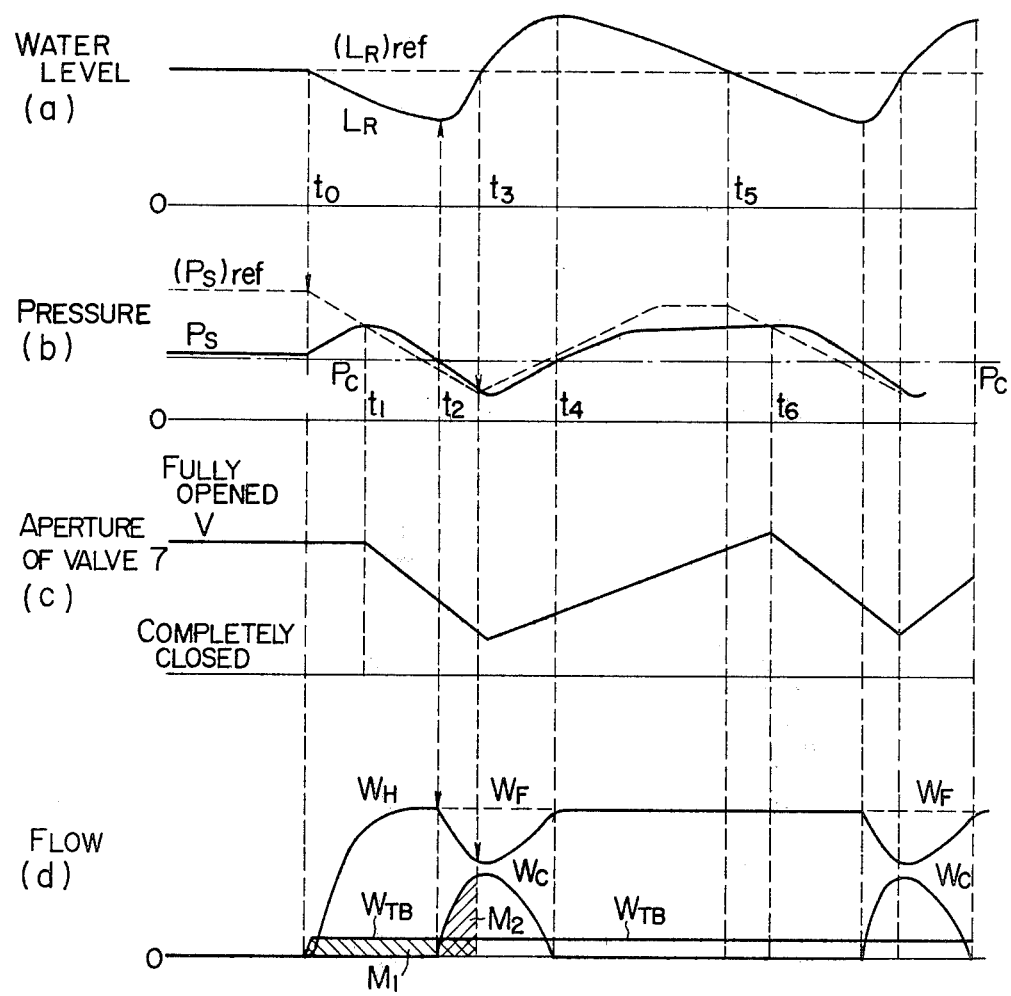
FIG. 2 shows graphically the changes in the aperture of the valve, the pressure and the flow all relevant to the control of the reactor water level according to a make-up water control apparatus as an embodiment of this invention and also the response of the water level to those changes.

Now, reference should be had to FIG. 2. Suppose that the RHR system is started at an instant and that the level $L_R$ of the reactor water lowers as shown in diagram (a). The references value $(L_R)_{ref}$ set by the reference water level setting means 33 is made approximately equal to the reactor water level $L_R$ assumed before the instant $t_0$ and the water level controller 32 receives an input $(L_R)_{ref}=L_R$ and in turn delivers a constant desired value, i.e. reference pressure $(P_s)_{ref}$ before the instant $t_0$. The pressure $P_s$ detected at the joining point J by the pressure detector 16 is slightly higher than a pressure $P_c$ to open the check valve 9 before $t_0$ since the RHR system is not operating before $t_0$. The pressure $P_s$ increases rapidly after the start of the operation of the RHR system but remains lower than $(P_s)_{ref}$. The pressure controller 17 receives an input $(P_s)_{ref}-P_s>0$ and controls the aperature V of the control valve 7 to the fully opened state. Consequently, the detected pressure $P_s$ is higher than the pressure $P_c$ to open the check valve 9 and it therefore follows that $W_c=0$ and $W_H=W_F$.

Figure 3:
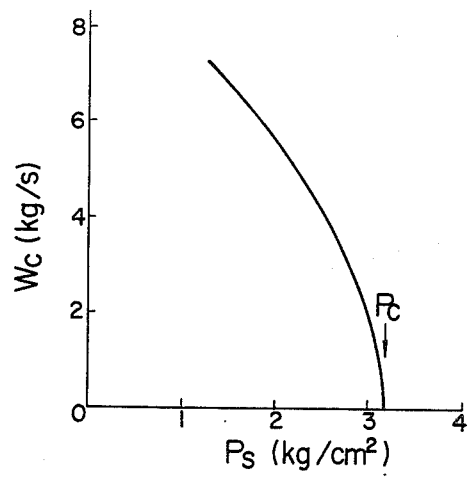
FIG. 3 graphically shows the relationship between the pressure at the outlet of the regulation valve and the make-up water flow in the control of the control valve aperture performed by the make-up water control apparatus.

When the level $L_R$ of the reactor water lowers at $t_0$ and the condition that $(L_R)_{ref}-L_R \geq 0$ is reached, the pressure setter 32 decreases the value $(P_s)_{ref}$. When the condition that $(P_s)_{ref}-P_s<0$ is reached at $t_1$, the pressure controller 17 starts to close the control valve 7. As the aperture of the valve 7 decreases, the pressure $P_s$ at the point J lowers. At an instant $t_2$, the pressure $P_c$ to open the check valve 9 exceeds the pressure $P_s$, that is, $P_c>P_s$ so that make-up water starts to flow at a rate $W_c$ from the tank 8 via the check valve 9. The expression (3) given below shows the relationship between the flow $W_c$ and the pressure $P_s$.

$$W_c \approx \sqrt{\frac{1}{k}(-P_s + P_o - H_c\gamma_w)} \quad (3)$$

where k is the coefficient of friction loss of the make-up water pipe, $P_o$ the pressure in the make-up water tank 8, $H_c$ the difference between the potential heads at the surface of the make-up water in the tank 8 and at the position of the feedwater pipe, and $\gamma_w$ the specific weight of the make-up water, all these quantities being constant. Accordingly, $W_c$ varies depending only upon $P_s$, as shown in FIG. 3. If the value under the radical sign in (3) is negative, as occurs in the case where $P_s$ exceeds $P_c$, then the check valve 9 is completely closed so that $W_c=0$. After $t_2$, it is seen that $W_F=W_c+W_H$. It should here be noted that $W_F$ remains constant before, at and after $t_2$ since $W_F$ is controlled to a roughly constant value by the control apparatus B governing the operation of the pump 10, that is, since $W_H$ is decreased by an amount equal to the increment of $W_c$. As a result of the above control that make-up water more than the exhausted water is supplied into the RHR system, the reactor water recovers its initial level $(L_R)_{ref}$. The instant t at which the water level $L_R$ returns to the value at $t_0$, is theoretically equal to the instant, i.e. $t_3$ in FIG. 2(a), when the exhausted amount $$M_1 = \int_{t_0}^{t} W_{TB} dt$$

becomes identical with the compensated amount $$M_2 = \int_{t_2}^{t} W_c dt.$$

Until the instant $t_3$, before which $(L_R)_{ref}>L_R$, both the preset value $(P_s)_{ref}$ and the aperture V of the valve 7 decrease. But after $t_3$, the condition that $(L_R)_{ref}<L_R$ is reached so that $(P_s)_{ref}$ begins to increase. The actual change in the pressure $P_s$ lags behind the preset value $(P_s)_{ref}$ and therefore $P_s$ starts to increase in retard of $(P_s)_{ref}$. At this time, $(P_s)_{ref}>P_s$ so that the aperture V of the valve 7 continues to increase for a certain time after $t_3$.

When $P_s$ increases until $P_s>P_c$ at $t_4$, the check valve 9 is completely closed and thereafter $W_c=0$. After $t_4$, the water level $L_R$ lowers owing to the exhaustion of $W_{TB}$ and the condition that $(L_R)_{ref}>L_R$ is again reached at $t_5$. The operation after $t_5$ is substantially the same as that after $t_0$ in the initial stage and the description of the further operation will be omitted. The control apparatus C attempts to stabilize the reactor water level by repeating the control operation in the period from $t_0$ to $t_5$. In FIG. 2, although the level fluctuation appears considerable, this is for the convenience of explanation and the actual fluctuation can be confined within a very small range. Now, consider the operation of the control apparatus A while the control apparatus A is at operation. In the control apparatus A, the pressure detected by the detector 14 increases upon closure of the valve 7 so that the regulation valve 3 is choked to decrease the internal pressure of the heat exchanger 4. Consequently, the pressure at the inlet of the control valve 3 increases to decrease the flow $W_H$.

The control apparatus C performs the control of reactor water level and the control of pressure in cascade, but only the control of water level is basically necessary so that it is only necessary to control directly the aperture of the control valve 7 by the pressure setter 32. In practice, however, the response to the change in the variable to be controlled is slow if the water level control system alone is employed. Therefore, the provision of the pressure control system as a minor control loop will improve the stability of control.

Next, the feedwater flow control apparatus B will be described. When the RHR system is started, the control apparatus B controls the temperature fall rates at various points in the reactor to be smaller than their corresponding, preset values. Namely, since the rate $(-\Delta\text{Temp}/\Delta t)$ of the fall of the reactor water temperature as one of the typical temperature fall rates associated with a reactor is expressed such that $$-\frac{\Delta\text{Temp}}{\Delta t} \approx \frac{1}{M_f}\{W_H(i_g - i_F) + W_c(i_f - i_F) \quad (4)$$
$$+ W_{TB}(i_g - i_f) - Q_R\}$$
$$= \frac{1}{M_f}\{W_F(i_g - i_F) - W_c(i_g - i_f)$$
$$+ W_{TB}(i_g - i_f) - Q_R\},$$

the flow $W_F$ of feed water into the reactor must be varied in accordance with the variations with time of $Q_R$ and $W_c$ in order to keep the temperature fall rate $(-\Delta\text{Temp}/\Delta t)$ of the reactor water constant at a desired value. The symbols appearing in the expression (4) are the same as those used in the expression (2), $W_c(i_f - i_F)$ being an amount of heat required to make the make-up water flow $W_c$ saturated in the reactor and $W_c(i_g - i_f)$ to turn the saturated water $W_c$ into steam.

To achieve such a control as described above, temperature detectors 34 and 35 detect temperatures at different points in the reactor 1 and the respective temperature fall rates $(-\Delta\text{Temp}/\Delta t)$ are calculated by temperature fall rate calculator 36 and 37. The most critical one of the temperature fall rates is selected by a maximum temperature fall rate selector 38. On the basis of the difference between the above selected value and the value $(-\Delta\text{Temp}/\Delta t)_{ref}$ set by a reference temperature-fall-rate setting means 39, the set value $(W_F)_{ref}$ for the flow of feed water supplied into the reactor 1 is determined by a function generator 40. The function generator 40 decreases the value for $(W_F)_{ref}$ if the temperature fall rate in question is excessive while it increases $(W_F)_{ref}$ in case of the rate being insufficient. The actual feedwater flow $W_F$ is controlled by controlling the flow $W_{TB}$ of steam supplied to the turbine 12 on the basis of the value $(W_F)_{ref}$. Namely, on the basis of the difference between the flow $W_F$ detected by a flow detector 18 and the value $(W_F)_{ref}$ set by the function generator 40, a function generator 19 generates a turbine speed reference signal $(N_T)_{ref}$. Consequently, the flow $W_{TB}$ of steam supplied to the turbine 12 is controlled by the combined operation of a turbine speed detector 20, a turbine speed controller 21 and the control valve 13 so that the turbine speed $N_T$ is controlled to make $W_F$ equal to $(W_F)_{ref}$. As a result, the temperature fall rate $(-\Delta\text{Temp}/\Delta t)$ in (4) is controlled to a desired value.

For example, if the temperature fall rate is excessive, the function generator 40 delivers an output for decreasing $(W_F)_{ref}$ so that $(N_T)_{ref}$ decreases to decrease the feedwater flow $W_F$ by choking the valve 13. As a result of this control, the value $W_F(i_g - i_F)$ in (4) decreases so that $(-\Delta\text{Temp}/\Delta t)$ decreases. On the other hand, if the temperature fall rate is insufficient, the function generator 40 delivers an output for increasing $(W_F)_{ref}$ so that $(N_T)_{ref}$ increases to increase the flow $W_F$ by opening the valve 13. Accordingly, $W_F(i_g - i_F)$ in (4) increases to increase $(-\Delta\text{Temp}/\Delta t)$. The control hereafter is continued until the condition that $(-\Delta\text{Temp}/\Delta t) \approx (-\Delta\text{Temp}/\Delta t)_{ref}$ has been reached.

In the feedwater control apparatus B, the function generators 40 and 19 may be replaced by blind controllers which receive deviation signals. The control apparatus B is a cascade control system comprising a temperature fall rate control section, a flow control section and a speed control section, but it may be only a temperature control system in which the control valve 13 for the turbine steam flow is directly controlled by the output of the function generator 40. The provision of the minor loops for flow and speed with the temperature fall rate control system will improve the stability and the response speed of the overall control system.

As described above with the control apparatuses A, B and C of the RHR system shown in FIG. 1, if each of the fluctuations of the reactor water level and the temperature fall rate occurs separately, the corresponding individual control apparatus operates to compensate the fluctuation. It should here be noted that each of the water level controller 32 and the function generator 40 must have suitable sensitive thresholds and that only when they receive inputs in excess of the thresholds, they control the aperture of the valves 7 and 13. With this constitution, the control of too frequent and negligible fluctuations can be prevented from taking place.

Now, the effects of the combination of the control apparatuses B and C will be considered. As seen from FIGS. 2a to 2d, the control apparatus C controls the make-up water flow $W_c$ only during a period ranging from $t_2$ to $t_4$ and the control apparatus B operates alone for the time other than the above period. Therefore, there is a possibility only during the period $t_2$ to $t_4$, that both the control apparatuses B and C operate jointly. In such a case, the most severe conditions are the following two: (a) the temperature fall rate is excessive and the reactor water level lowers, and (b) the rate is insufficient with elevated level. Consider first the former case (a). According to this invention, since the flow of steam going out of the reactor equals $W_H + W_{TB}$ and the flow $W_F$ of feed water supplied into the reactor equals $W_H + W_c$, the following reasoning will hold. Since the temperature fall rate is excessive, the control tends toward decreasing $W_F$. On the other hand, since the reactor water level $L_R$ lowers, $P_s$ decreases (the aperture of the value lessens) to decrease $W_H$. The decrease in $P_s$ causes $W_c$ to increase. As a result, $W_F(i_g - i_F)$ in FIG. 4 decreases and $W_c(i_f - i_F)$ in (4) increases to decrease the temperature fall rate. The water level $L_R$ rises since $W_c$ in excess of $W_{TB}$ is supplied into the closed loop (i.e. feedwater pipe). Thus, the temperature fall rate $-\Delta\text{Temp}/\Delta t$ and the reactor water level $L_R$ can both resume desired values.

In the latter case (b) mentioned above, the insufficient rate of the fall of the reactor temperature causes $W_F$ to increase while the elevated water level $L_R$ causes the decrease in $W_c$. Since in the RHR system having a closed loop, $L_R$ is determined depending only on $W_c$, the transient rise of the water level returns to its initial level after the condition that $W_c = 0$ has been reached. The temperature fall rate in this case increases with the increase in $W_F(i_g - i_F)$.

Also, the control apparatuses B and C can operate jointly in the two cases as follows: (c) insufficient temperature fall rate with lowered water level and (d) excessive temperature fall rate with elevated water level. In either case, the joint control serves to stabilize both the fluctuations. This will be briefly described below. Since the temperature fall rate is determined depending on both $W_H$ and $W_c$, the control apparatus B is affected by the control apparatus C. However, after the condition that $W_c = 0$ has been reached, the control apparatus B operates alone. In addition to this, the control apparatus operates intermittently so that the above influence takes place only for a short period. This is how $(-\Delta\text{Temp}/\Delta t)$ can be shifted toward stabilization. On the other hand, since the RHR system has a closed loop, the water level $L_R$ is normally determined depending on both $W_c$ and $W_{TB}$ (whereas the transient fluctuation of $L_R$ is caused by the variation of $W_F$). When the control apparatus C is operating, $W_c > W_{TB}$. It is considered that the control apparatus C is seldom affected by the control apparatus B during this while. Thus, the water level $L_R$ is also stabilized. In conclusion, the simultaneous operation of the control apparatuses B and C also functions to stabilize both $L_R$ and $(-\Delta Temp/\Delta t)$.

Figure 4A:
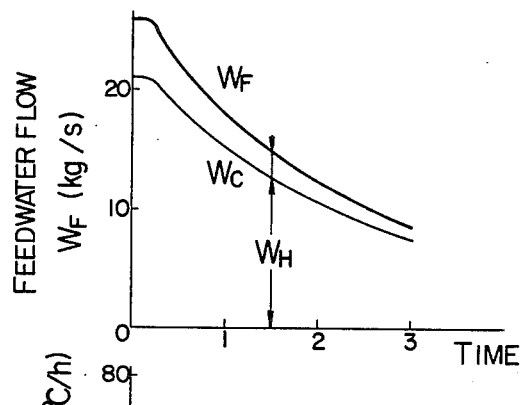
FIGS. 4a to 4c illustrate that the feedwater control apparatus and the make-up water control apparatus according to this invention can control the reactor water level and the temperature fall rates at several points in the reactor to desired values.
Figure 4B:
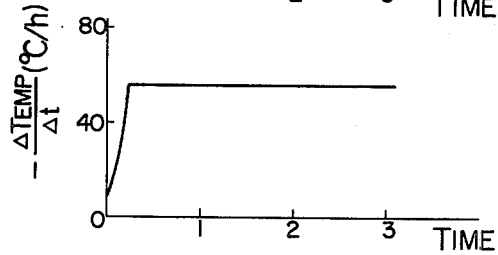
Figure 4C:
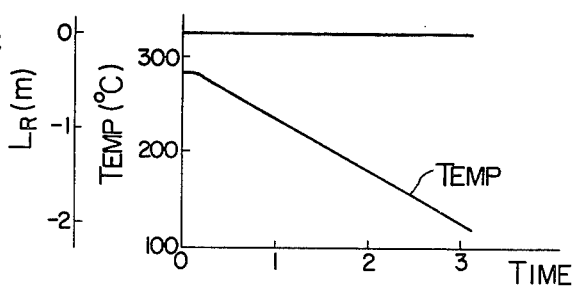

FIGS. 4a to 4c show the performance characteristics of an RHR system as an embodiment of this invention. If the above described control is performed with $(W_F)_{ref}$ set at $W_F$ shown in FIG. 4a, the reactor water level can be kept constant while the temperature fall rate is maintained at a desired value. Namely, the reactor water level $L_R$ can be always kept constant by the supply of make-up water (FIG. 4c) and also the reactor temperature Temp can be lowered at the maximum fall rate, i.e. during the shortest period, except in the period of several tens of minutes after scram. Immediately after scram, $Q_R$ becomes very much, as shown in FIG. 2, and in order to attain the temperature fall rate having a usual value, the feedwater flow $W_F$ must be very large so that the turbine and the pump are overloaded. To prevent this overload, $W_F$ must be prevented from becoming too large by setting the maximum limit allowable to the output $(W_F)_{ref}$ of the function generator 40.

As described above, according to this invention, the reactor water level can be stably kept constant and moreover the temperature fall rates can be kept at desired values smaller than the corresponding maximum values allowable, so that the reactor can be cooled down at the maximum speed (i.e. double the speed attainable by the conventional control system) without deteriorating the pressure vessel etc. Further, according to this invention, the automated system contributes much to the reduction of human labor.

Although in the above embodiment the temperature of the saturated water in the reactor is directly detected, this invention can be equally applied to the system in which the pressure of the saturated steam in the reactor vessel is detected and converted to temperature to determine the temperature of the reactor water. This type of the embodiment will enjoy a higher control capability since the response of pressure to the rapid change in the variables of the reactor is faster than that of temperature.

Furthermore, in the above embodiment, the temperature fall rates are obtained at several points in the reactor and the flow of feedwater into the reactor is determined depending on the maximum one of the temperature fall rate. In the case, however, where the reactor vessel, the flange of the reactor vessel, the feedwater nozzle etc. have their individual allowable temperature fall rates different from one another, a system may be employed in which reference values $(W_F)_{ref}$ are set for the respective members in the reactor and the flow of feedwater is determined by choosing the minimum one of the reference values. In this case, the temperature fall rate at the weakest member is controlled so that the reliability can be improved.

In addition to the above merits, the following advantages can be obtained according to this invention.

(1) Since the reactor water level can be stably kept constant, the thermal impacts which are inherent to the operation of the ECCS can be prevented so that the deterioration of the strength of the reactor structure can be suppressed.

(2) Since the temperature fall rates at several points in the reactor can be set smaller than their allowable limiting values, the reactor can be cooled down in the shortest time without degrading the characteristics of instruments.

(3) The automated constitution can reduce human labor and improve the operating reliability as well.

We claim:

1. An apparatus for controlling a residual heat removal system for a nuclear reactor, comprising a reactor housed in a containment vessel; a main steam conduit for leading reactor steam to a turbine for generating electric power, said main steam conduit having isolation valves near said containment vessel; and a residual heat removal system to be started upon closure of said isolation valves to remove residual heat out of said reactor, said residual heat removal system including a closed loop having a heat exchanger for condensing steam generated in said reactor into water and a pump for pressurizing the condensed water sent thereto through a first control valve and for supplying said pressurized water into said reactor, and an auxiliary turbine actuated by reactor steam sent thereto through a second control valve so as to drive said pump, wherein a tank for containing make-up water therein, a check valve inserted in a make-up water pipe for supplying said make-up water to the outlet of said first control valve, a make-up water control apparatus for controlling said first control valve according to the lowering of the level of the reactor water after the closure of said isolation valves so as to lower the pressure at the outlet of said first control valve, and a feedwater flow control apparatus for determining the aperture of said second control valve in accordance with the deviation signal representing the difference between the temperature fall rate in said reactor and a desired value for said rate are further provided and wherein said make-up water control apparatus supplies make-up water into said reactor to compensate the lowered level of the reactor water when the pressure at the outlet of said control valve falls below the pressure to open said check valve while the feedwater flow is controlled by said feedwater flow control apparatus in accordance with said desired value for said rate so as to control the water level to the initial level.

2. An apparatus for controlling a residual heat removal system for a reactor, as claimed in claim 1, wherein said make-up water control apparatus includes a water level control means for deriving a desired value for the pressure at said outlet of said first control valve from the deviation signal representing the reactor water level and a pressure control means for deriving a desired value for the aperture of said first control valve in accordance with the deviation signal representing the difference between the output of said water level control means and said pressure at said outlet of said first control valve and wherein said feedwater flow control apparatus includes a first control means for obtaining a desired value for feedwater flow on the basis of said deviation signal, a second control means for obtaining a desired value for the speed of said auxiliary turbine on the basis of the output of said first control means and the signal representing the actual feedwater flow and a third control means for controlling the aperture of said second control valve on the basis of the output of said second control means and the actual speed of said auxiliary turbine.

3. An apparatus for controlling a residual heat removal system for a nuclear reactor, comprising a reactor housed in a containment vessel; a main steam conduit for leading reactor steam to a turbine for generating electric power, said main steam conduit having isolation valves near said containment vessel; and a residual heat removal system to be started upon closure of said isolation valves to remove residual heat out of said reactor, said residual heat removal system including a closed loop having a heat exchanger for condensing steam generated in said reactor into water and a pump for pressurizing the condensed water sent thereto through a first control valve and for supplying said pressurized water into said reactor, and an auxiliary turbine actuated by reactor steam sent thereto through a second control valve so as to drive said pump wherein a feedwater flow control apparatus is further provided which determines the aperture of said second control valve in accordance with the deviation signal representing the difference between the temperature fall rate in said reactor and a desired value for said temperature fall rate.

4. An apparatus for controlling a residual heat removal system for a reactor, as claimed in claim 3 or claim 1, wherein said feedwater flow control apparatus includes a first control means for obtaining a desired value for feedwater flow on the basis of said deviation signal, a second control means for obtaining a desired value for the speed of said auxiliary turbine on the basis of the output of said first control means and the signal representing the actual feedwater flow and a third control means for controlling the aperture of said second control valve on the basis of the output of said second control means and the actual speed of said auxiliary turbine.

5. An apparatus for controlling a residual heat removal system for a reactor, as claimed in claim 1, wherein said make-up water control apparatus includes a water level control apparatus for deriving a desired value for said pressure at said outlet of said first control valve from the deviation signal representing the level of said reactor level and a pressure control apparatus for deriving a desired value for the aperture of said first control valve from the signal representing the difference between the output of said water level control apparatus and said pressure at said outlet of said first control valve and wherein said first control valve is controlled by said pressure control apparatus.

6. An apparatus for controlling a residual heat removal system for a reactor, as claimed in claim 2, wherein a third control valve is provided at the inlet of said heat exchanger and a condensate flow control apparatus is provided to control said third control valve in such a manner that the internal pressure of said heat exchanger is kept constant.

7. An apparatus for controlling a residual heat removal system for a reactor, as claimed in claim 5, wherein a third control valve is provided at the inlet of said heat exchanger and a condensate flow control apparatus is provided to control said third control valve in such a manner that the internal pressure of said heat exchanger is kept constant.

* * * * *